United States Patent [19]
Babacz

[11] Patent Number: 5,234,723
[45] Date of Patent: Aug. 10, 1993

[54] CONTINOUS PLASMA ACTIVATED SPECIES TREATMENT PROCESS FOR PARTICULATE

[75] Inventor: Robert J. Babacz, Bethlehem, Pa.

[73] Assignee: Polar Materials Inc., Martins Creek, Pa.

[21] Appl. No.: 593,242

[22] Filed: Oct. 5, 1990

[51] Int. Cl.⁵ ............................................ B05D 3/06
[52] U.S. Cl. .................................. 427/491; 427/212; 427/215; 427/221; 427/255.6; 427/294; 427/296; 427/488; 427/535; 427/536; 427/569

[58] Field of Search ................................... 427/39–41, 427/491, 212, 215, 221, 255.6, 294, 296, 488, 535, 536, 569

[56] References Cited

U.S. PATENT DOCUMENTS 4,495,044 1/1985 Banks .......................... 427/39 X Primary Examiner—Bernard Pianalto
Attorney, Agent, or Firm—Lerner, David, Littenberg, Krumholz & Mentlik

[57] ABSTRACT

The present invention includes methods for treating particles with plasma activated species. Through the use of the present invention, particles can be functionalized, coated or grafted.

13 Claims, 2 Drawing Sheets

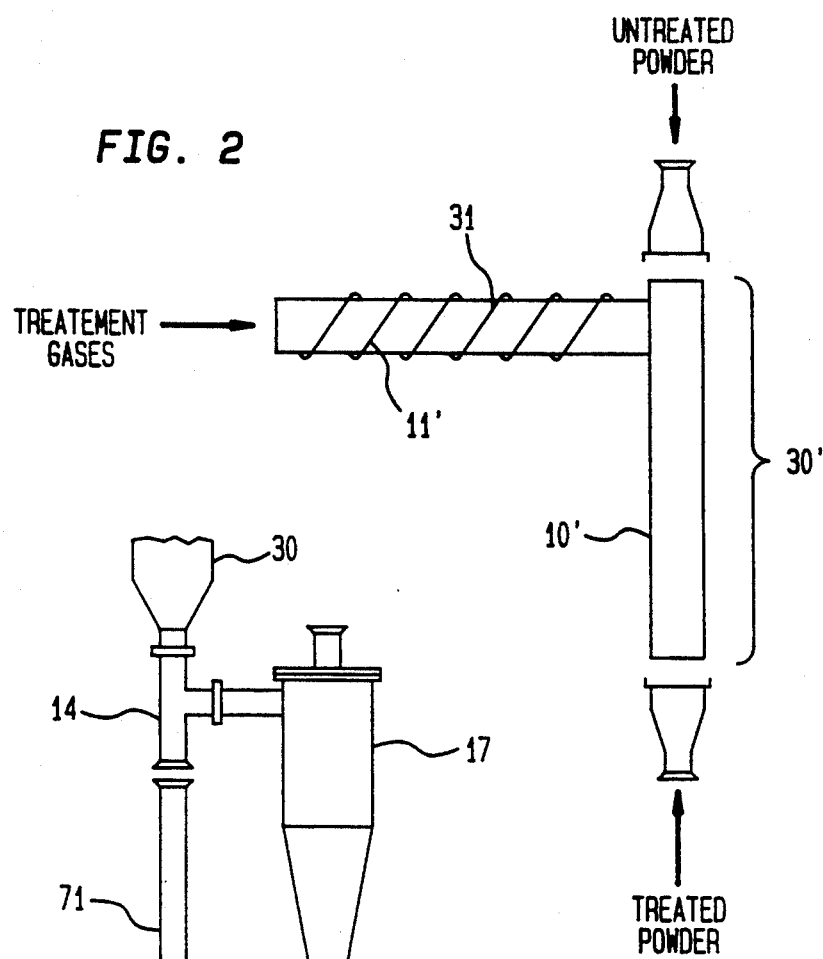
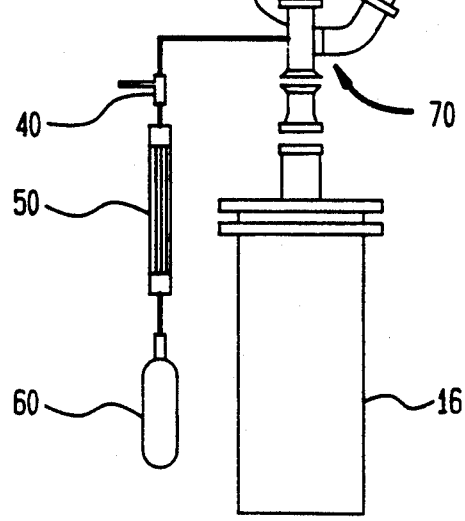
FIG. 2
FIG. 3

# CONTINOUS PLASMA ACTIVATED SPECIES TREATMENT PROCESS FOR PARTICULATE

FIELD OF THE INVENTION

The present invention relates to an apparatus and a method for continuously treating particulate with a plasma activated species. The present invention further relates to particulate treated thereby.

BACKGROUND OF THE INVENTION

The use of reactive or excited gases in the treatment of particulate has held much promise for product development. For example, by coating particulate, or changing their surface chemistry, powders which would otherwise be incompatible with a variety of host materials may be rendered compatible therewith. Plasmas could be used to deposit hydrophobic coatings on moisture-sensitive powders to reduce degradation and increase storage time or, conversely, particles can be modified such that they disperse into liquids more readily. However, the promise of this technology has gone largely unfulfilled due to the rigors of the various methodologies employed to date.

McCoy, U.S. Pat. No. 3,305,466 relates to a method and apparatus for reacting gas and solids. The method of McCoy is applicable to a reaction between a gaseous or vaporized reactant and a solid which could be comminuted therewith and which, in comminuted form, is susceptible to the effect of an alternating electric current. According to the method of McCoy, solids which are susceptible to the effect of an alternating electrostatic field are generally heated and introduced into a reaction chamber where they are agitated by the application of an alternating electric field and by the countercurrent flow of a reaction gas. For example, ferrite ore containing tungsten was heated to 300° C. and reacted with carbon tetrachloride. This method is, however, limited. First, the requirement of alternating electric current susceptibility and the application of high temperatures significantly limits the type of particle which may be used and thus treated. Furthermore, this process is not energy efficient. Moreover, as McCoy requires agitation of its particles by the flowing gas, it is limited to operation at relatively high gas pressures. Finally, the reaction gas utilized often presents a safety and a disposal problem.

Treatments using plasma activated species may eliminate many of the disadvantages associated with ordinary gas treatment processes and provide results that are otherwise unobtainable.

Furthermore, plasma activated species treated powders, may advantageously be used in a number of environments. For example, ultra-high molecular weight polyethylene may be used as an additive for thermoplastic composites. Treated rubber may be used in non-slip epoxy flooring. Treated talc, clay, silica, carbon black and ground tires may be used as filler material. Treated pigments may be used for paints and coatings, treated micronized waxes may be used in inks, lubricants and coatings, and treated polymer dispersions may be used in coatings and emulsions. Unfortunately traditional plasma techniques for treating powders or particles are generally batch or modified batch procedures which are not economically feasible. See, for example, U.S. Pat. Nos. 4,423,303, 4,619,861, 4,685,419, 4,810,524 and 4,867,573. In addition, the batch plasma treatment of certain particles is not possible due to their size, shape or density.

Furthermore, particles cannot be treated uniformly in a batch mode because particles in the bulk receive less plasma exposure than particles at the surface, even though new particles are continuously moving to the surface. To mitigate this problem, long treatment times and/or violent agitation are generally necessary. However these treatments preclude the use of delicate or treatment-time sensitive powders and often result in the over exposure of a significant percentage of the treated particles. In the case of, for example, polymer particles, this may lead to discoloration, nonuniformity of structure or properties, and the like.

The present invention makes feasible the use of plasma activated species to treat powders or particulate continuously, and eliminates many of the deficiencies in conventional batch treatments. Specifically, the present invention provides methods and apparatus for treating particulate in a continuous fashion with a plasma activated species. The present invention is particularly well suited for the treatment of particulate which because of size, delicacy, or composition, have not readily lent themselves to such treatments in the past. For example, the present invention is particularly useful for the treatment of polymer particles.

OBJECTIVES AND SUMMARY

One object of the present invention is to provide an apparatus which can be used to treat particulate with a plasma activated species in a continuous fashion.

In accordance with one aspect of the present invention there is provided an apparatus for continuously treating particulate with at least one plasma activated species comprising: means for continuously providing at least one plasma activated species in a treatment zone and maintaining said treatment zone at sub-atmospheric pressure; means for continuously dropping a particulate through the treatment zone thereby treating the particulate with at least one plasma activated species; and means for continuously recovering treated particulate.

The apparatus in accordance with the present invention has advantageously, and unexpectedly, been found to provide an excellent arrangement for the treatment of particulate by at least one plasma activated species in a continuous fashion. The apparatus uses gravity to move particulate through a treatment zone containing a plasma activated species. Because the apparatus eliminates the need for high temperature and/or agitation of particulate, delicate powders which could not otherwise be treated, may be processed. While apparatus according to some embodiments of the present invention may have a relatively small throughput at any given time, its continuous operation can provide yields which are superior to conventional batch apparatus of similar size. Furthermore, because the volume of particulate treated in any given time is reduced in comparison to a batch apparatus, shorter exposure times are required and more uniform treatments are obtained.

Another object of the present invention is to provide methods for treating particulate in a continuous fashion with at least one plasma activated species.

Therefore and in accordance with another aspect of the present invention there is provided a continuous process of treating particulate with at least one plasma activated species comprising the steps of: continuously providing at least one plasma activated species in a treatment zone maintained at subatmospheric pressure;

continuously dropping a particulate through the treatment zone thereby treating the particulate with at least one plasma activated species; and continuously recovering treated particulate.

The method of the present invention allows for the continuous treatment of particulate by a plasma activated species. The method involves continuously providing a plasma and dropping particulate through a treatment zone containing the plasma activated species and continuously recovering the treated particles there from. The method employs the use of gravity as a means for transporting particulate through the system and has resulted from the recognition that such a simple and gentle procedure can often result in complete treatment of even the most delicate and difficult particulate.

BRIEF DESCRIPTION OF THE DRAWINGS

Preferred embodiments of the present invention will be described in greater detail with reference to the accompanying drawings, wherein like members bear like reference numerals and wherein:

FIG. 2 is a schematic representation of another preferred embodiment in accordance with the present invention in which the means for continuously providing at least one plasma activated species in a treatment zone is not coordinate and/or coaxial with the treatment zone or treatment chamber.

FIG. 3 is a fragmentary view of a portion of the schematic representation of the apparatus of FIG. 1 showing additional apparatus used for plasma grafting.

DETAILED DESCRIPTION OF THE PREFERRED EMBODIMENT

Figure 1:
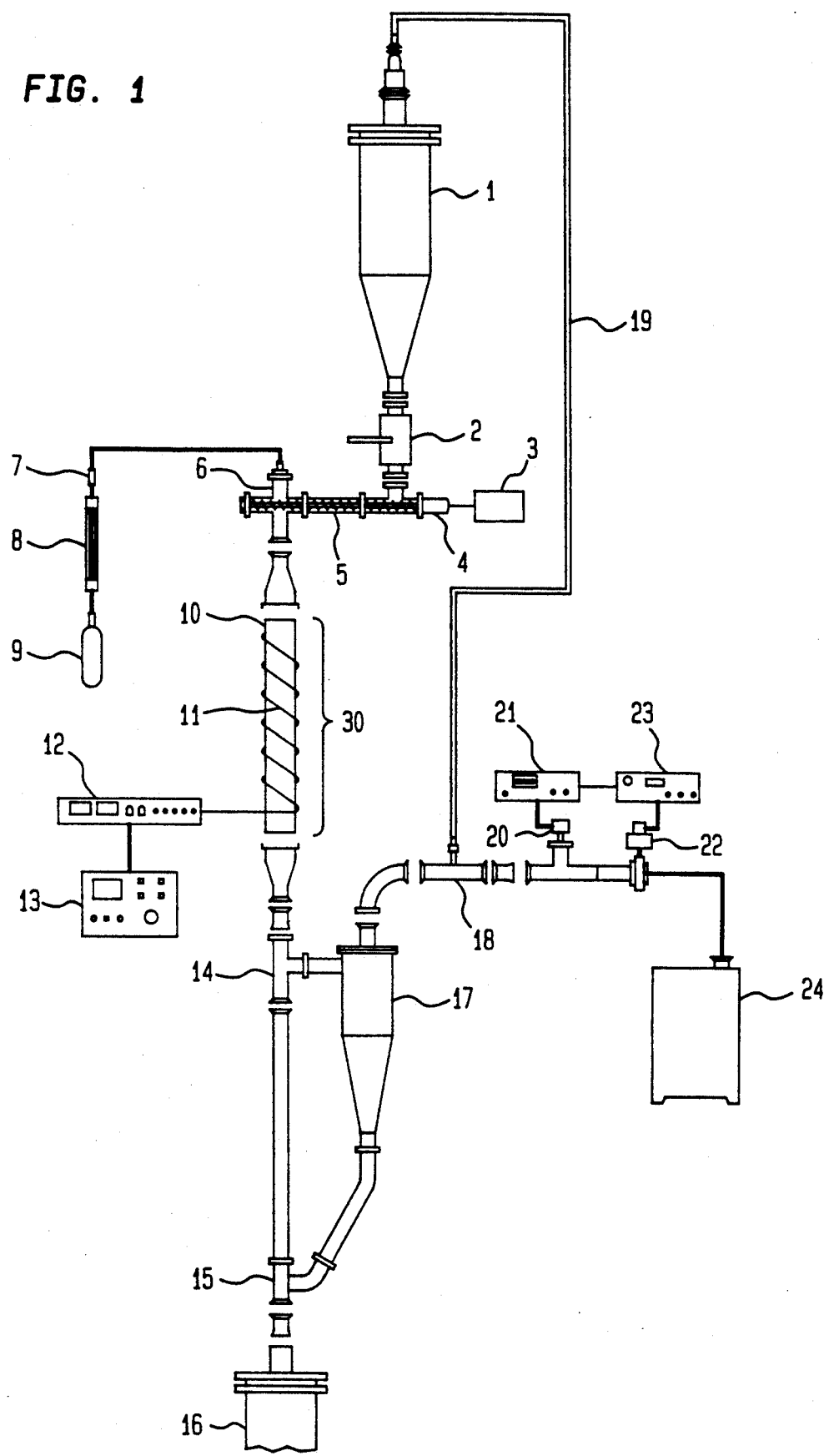
FIG. 1 is a schematic representation of a continuous plasma treatment apparatus in accordance with a preferred embodiment of the present invention wherein the treatment zone, the means for continuously providing at least one plasma activated species, and the treatment chamber are coaxial.

Generally speaking, the method in accordance with the present invention includes a step of continuously providing a plasma activated species in a treatment zone maintained at sub-atmospheric pressure, continuously dropping a particulate through the treatment zone thereby treating the particulate with plasma activated species, and continuously recovering treated particulate.

The term "continuous" as used herein means that the length of time that any particular particle is treated is substantially less than the length of time that the apparatus is in operation. Furthermore, the term "continuous" as used herein means that a particle to be treated only traverses a treatment zone containing plasma activated species once during the course of that particles manipulation through an apparatus of the present invention. The particle may be recovered and re-introduced to the apparatus or may be further modified by the introduction of the particulate to other apparatus.

"Plasma activated species" in accordance with the present invention contemplates reactive gaseous species that include, or result from the ionization of an ionizable gas into a primary plasma. The term "primary plasma" indicates the excited states of ionizable gas while that gas is under the direct influence of an electromagnetic field or other plasma generating device and also represents the highest activated states in this reaction system. A "plasma" or "primary plasma" is created by introducing an ionizable gas into a vacuum chamber and exciting the gas with, for example, radio frequency (RF) energy. The RF energy dissociates the gas into electrons, ions, free radicals and metastable excited species. See Cormia, "Use Plasmas To Re-Engineer Your Advanced Materials", *R&D Magazine*, Jul. 19, 1990 at page 60, the text of which is hereby incorporated by reference. Plasma activated species in accordance with the present invention may include, without limitation, electrons, ions, free radicals, metastable species the latter of which are commonly referred to as plasma afterglow. Of course, when reference is made to "a plasma activated species", the term should be more correctly understood as at least one plasma activated species.

The term "treatment zone" refers to a region within the apparatus in which the powder or particulate material to be treated comes into contact with the primary plasma and/or other plasma activated species. In some embodiments, such as that illustrated in FIG. 1, particulate will first contact an ionizable gas. Thereafter, as the particulate move into the region of influence of a plasma generating RF electrode, the particles will come in contact with a primary plasma as previously defined. The particulate will remain in contact with the primary plasma for the entire length of the plasma generating electrode, and possibly for some short distance thereafter.

However, as the particulate move further down the treatment chamber and away from the plasma generating electrode, the plasma begins to return to less excited states forming other plasma activated species. These species are likely to still be reactive and the treatment zone encompasses them to the extent that they are. Therefore, if the treatment chamber is long enough, the treatment zone may be that portion of the treatment chamber in which the particulate may react with or be acted upon by plasma activated species. Thus the treatment zone may be shorter than the treatment chamber. If however, the treatment chamber is short, then the treatment zone extends roughly from the point at which a primary plasma is formed, or just there before, through the point at which the particulate is separated from the plasma activated species. It should also be mentioned that the rate of the flow of ionizable gas may have an influence in defining the length and extent of the treatment zone. If, for example, the treatment chamber is long, but the rate of flow of ionizable gas is significantly high, plasma activated species may extend through a greater length of the treatment chamber than would otherwise be apparent.

The method, broadly described above, may be used to alter the surface, or to surface treat particulate by "functionalization", "coating", or "grafting". In "functionalization", the gases that are used to create the plasma and plasma activated species cannot be polymerized. The electrons and the active species generated in the plasma by the ionization of the gas interact with the particle surface. The plasma activated species are thought to extract atoms such as hydrogen or molecules such as methyl groups from the surface of the material, thereby leaving an active site. Active sites created on the surface react with other active species to form various chemical functional groups on the particle's surface.

In a plasma coating, complex gases such as methane or propylene or volatile monomers are introduced into a chamber and ionized. This creates various active fragments that re-combine as a film on the surface of the particle and conform very accurately to the contour of the particle surface.

Finally, grafting is a hybrid of plasma functionalization and conventional chemistry. In this process, a noble-gas plasma such as argon or helium creates free radicals on the surface of the particulate. After plasma activation, and before exposure to the atmosphere the particle's surface is exposed to, for example, a vapor of an unsaturated monomer. The free radicals on the surface react with the unsaturated monomer causing a polymer layer to be grafted on to the activated particle's surface.

When coating particulate, it is not necessary, in all applications, that the coating be uniform. Generally speaking, a partial coating as thin as 50 angstroms may be sufficient for certain applications such as harmonizing particulate with a specific polymer binder. However, to obtain a uniform coating of material on a particle, generally the coating will have a thickness of at least about 500 angstroms and will range up to about 1 micron in thickness. The exact thickness of the applied coating will vary with the size and composition of the particle being coated, the composition of the coating being applied, and the extent to which the particle is exposed to the primary plasma or plasma activated species.

The present invention is useful on a broad variety of powders or particulate. These may include the class of compositions broadly known as polymers and more specifically may include powders or particulate of polyolefins such as polyethylene, polypropylene, polyisobutylene, and ethylene-alpha-olefin copolymers; acrylic polymers and copolymers such as polyacrylate, polymethylmethacrylate, polyethylacrylate; vinyl halide polymers and copolymers such as polyvinyl chloride; polyvinyl ethers such as polyvinyl methyl ether; polyvinylidene halides, such as polyvinylidene fluoride and polyvinylidene chloride; polyacrylonitrile; polyvinyl ketones; polyvinyl amines; polyvinyl aromatics such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; natural and synthetic rubbers, including butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers, and polyurethane rubbers; polyamides such as Nylon 66 and polycaprolactam; polyesters, such as polyethylene terephthalate; polycarbonates; polyimides; polyethers; fluoropolymers such as polytetrafluoroethylene and fluorinated ethylenepropylene.

Inorganic materials that can be surface modified in accordance with the present invention, include minerals such as talc and clay; elemental oxides such as silica, alumina, titania; carbon black; pigments; metal oxides such as iron oxides, and ceramics.

Powder or particulate, in accordance with the present invention, generally includes a size range of from about 0.1 microns to about 1.0 centimeter. However particulate most often treated in accordance with the present invention generally range in size from about 1 micron to about 1000 microns.

Typical gases which are used for functionalization of, for example, polymer powders include room air, synthetic air, oxygen, nitrogen, ammonia, inert or noble gases, sulphur dioxide, methane, nitrous oxide, halogenated hydrocarbons, and water vapor. Typical gases useful for coating powders include alkanes, including ethane, propane, and butane; alkenes such as ethylene, or propylene; fluorocarbons such as tetrafluoarethylene, hexafluoropropylene and hexafluoropropane; organosilicons such as hexamethyldisiloxane, tetramethyldisiloxane and tetraethoxysilane. The organosilicones may optionally be mixed with oxidizers such as oxygen and nitrous oxide. Mixtures of the aforementioned gases such as the use of propylene and a noble gas is also contemplated. Of course, the choice of gas is virtually limitless so long as it is ionizable to form plasma activated species.

The apparatus and method of the present invention will be better understood with reference to FIG. 1 which illustrates a preferred embodiment of the present invention. This apparatus is configured to facilitate powder functionalization. However, if the coating desired is thin enough, the apparatus may also be used for particle coating. Untreated powder or particulate is first loaded into at least one hopper 1, such as a 10 inch diameter conical discharge hopper. The hopper 1 may be fabricated from material sufficient to withstand full vacuum. A vacuum ball valve 2 such as those available from the A & N Corporation, Inglis, Fla. (such as model 2"100TQF) controls the flow of powder from feed hopper 1. Without the ball valve 2, untreated powder would discharge into treatment chamber 10 due to expansion of air in feed hopper 1 as vacuum is initially applied. A feed screw assembly is disposed at the other side of valve 2 to receive the powder or particulate after it passes through the valve. The feed screw assembly consists of a 1.3-inch diameter auger 5 with a 1-inch pitch connected to variable speed motor 3 through a rotary motion feedthrough 4 (A&N Corporation, Model 125-FTR-S) and supported by a bearing at the end that empties into treatment chamber 10.

The feed screw assembly discharges into treatment chamber 10 which is fabricated from 4-inch inside diameter by 36-inch long glass process pipe available from O-I/Schott Process Systems, Inc., Vineland, N.J. (Model No. 6300-40036)

The flow of ionizable treatment gas from cylinder 9 to inlet 6 of chamber 10 is monitored by rotameter 8 (Cole-Parmer, Chicago, Ill., No. N-03227-00) and controlled by metering valve 7 (Nupro Company, Willoughby, Ohio, No. S-SS4).

A plasma electrode 11 is provided and consists of 16 turns of ¼-inch diameter copper tubing wrapped around the outside diameter of treatment chamber 10 over a length of about 28 inches. Plasma electrode 11 in combination with 13.56 megahertz RF power supply 13 (ENI, Inc., Rochester, N.Y., No. ACG-5) and matching network 12 (ENI, Inc., No. MW-5) generate a primary plasma activated species by electromagnetic activation of the ionizable treatment gas. In this embodiment of the present invention the length of treatment zone 30 is roughly coextensive with the length of plasma electrode 11 and is generally defined thereby. However, as is explained in more detail herein, treatment zone 30 may actually extend downstream from the electrode 11 toward the cyclone separator 17 and the tee 14. While it is unlikely that a primary plasma exists far downstream from electrode 11, plasma activated species may still be present and active.

Surface functionalization of the powder is accomplished as the powder falls by gravity down through treatment chamber 10 and contacts the activated species. Treated powder exits the treatment zone 30 and the treatment chamber 10 and pass through tee 14. A majority of the powder passes straight through tee 14 directly into a 10-inch diameter discharge hopper 16. A minority of the treated powder and the exiting ionizable gas pass through the leg of tee 14 into cyclone separator 17. The cyclone separator is 5 inches in diameter with a 10-inch straight section, a 10-inch long cone section, a 1.5-inch diameter inlet, a 1.5-inch diameter powder outlet, and a 2-inch diameter gas outlet. The powder separated in cyclone separator 17 discharges into hopper 16 through tee 15 and gases are conveyed to vacuum pump 24. (Leybold, Inc., Export, Pa., No. D60A)

The pressure of the system is monitored by capacitance manometer 20 (MKS Instruments, Inc., Andover, MA., No. 122A) and pressure display 21, (MKS Instruments, Inc., No. PDR-D-1) and controlled by throttle valve 22 (MKS No. 253A-1-40-1) and throttle valve controller 23 (MKS No. 252C).

Tee 18 and vacuum line 19 evacuate gasses from feed hopper 1 when the system is initially pumped-down with ball valve 2 closed. Without this connection, differential pressure may cause uncontrolled discharge of powder in feed hopper 1 when ball valve 2 is opened.

In operation, untreated powder is loaded into feed hopper 1 with the system initially at atmospheric pressure and ball valve 2 closed. The apparatus, including the feed hopper is then evacuated to a stable base pressure, generally around about 0.01 Torr through about 0.1 Torr, depending on the composition of the untreated powder. Operating pressure is generally maintained between about 0.01 and 10.0 Torr and more preferably between about 0.01 and 1.0 Torr using vacuum pump 24. The ionizable gas flow rate usually between 10 and 1000 standard cubic centimeter per minute (sccm) and more preferably between about 10 and about 100 sccm is established and maintained. The RF power supply 13 is energized to create a plasma and plasma activated species of the ionizable gas in the treatment chamber 10 and, more specifically, in treatment zone 30. The RF power supply provides power which generally ranges from about 50 to about 5000 watts and, more preferably from about 100 to about 300 watts. The feed screw assembly is set to the desired rotational speed to provide for a feed rate of powder of between about 0.1 and about 2.0 pounds per minute and, more preferably, between about 0.1 and 1.0 pounds per minute. Ball valve 2 is then opened to permit powder to flow from the hopper 1 to treatment chamber 10 and to treatment zone 30. These process parameters are generally relative to the apparatus described in detail herein and illustrated in FIG. 1. However, these parameters may vary widely as the dimensions of the apparatus change to accommodate, for example, a higher through-put. Thus a 4 foot diameter tube could accommodate a particulate throughput as high as 200 pounds per minute. Of course, pressures, flow rates of ionizable gases, and power levels will have to be scaled up accordingly. Furthermore, a particle distribution system may be necessary to insure uniform particle distribution though the entire cross section of the treatment chamber.

In operation, there is little mechanical interaction between the particles as they pass through the treatment zone. The degree of mechanical interaction between particles, and the degree of mechanical interaction between particles and the surrounding gas is far less than is typically encountered in a fluidized bed or similar reactor. Thus, the downward motion of each particle through the treatment zone approximates free fall, with acceleration and velocity approaching those achieved by particles falling in a vacuum (with some lighter particles. The vacuum may also influence velocity). Moreover, the ionizable gas and plasma activated species within the treatment zone flow downwardly, concurrent with the particles. To the extent there is any mechanical interaction between the plasma activated species and the particles, this interaction tends to accentuate the downward motion of the particles. The residence time of each particle in the treatment zone is relatively short, typically less than about 3 seconds, preferably less than about 1 second depending upon the length of the treatment zone and treatment chamber. Moreover, the residence time of the particles within the treatment zone is substantially uniform. These factors aid in providing substantially uniform treatment of the particles, and in processing relatively delicate particles without appreciable damage.

Finally, the functionalized particulate is recovered and collected in discharge hopper 16, either directly or after being separated from the ionizable treatment gas or plasma activated species via the cyclone separator 17. In some circumstances, where, for example, absolute uniformity is essential, it may be advantageous to continue to segregate the particles that fall through tee 14 and those which must first be separated by, for example, cyclone separator 17. In this case, the separator can feed into a separate hopper (not shown) so the particles are not recombined.

Of course, it may be useful to use more than one feed hopper 1 each of which may include the same or different particulate. The use of a plurality of hoppers containing the same particulate is one way of providing a continuous source of untreated starting material. The use of a plurality of different hoppers containing different particulate will allow for the formation of hybrid treated mixtures of varying powder content.

The feed hopper may also be eliminated entirely and replaced with other forms of fee devices. Thus the plasma activated species treatment apparatus of the present invention could be directly fed by, for example, a grinder. Similarly, such particulate creating devices may feed into intermediate holding devices, such as feed hopper 1 by using alternating slide gates such as those described in Application Bulletin No. SR 1.31 from the Red Valve Company, Inc., Carnegie, Pa., entitled "Red Valves Used As Rotary Air Lock Feeders".

While the length of the treatment zone 30 may vary with the type of particulate and the type of application, it may be impractical to build a single apparatus that is long enough for every application. In such cases, it is possible to convey the once treated particles from the discharge hopper 16 of a first apparatus to the feed hopper 1 of a second apparatus so that treatment may continue. Similarly, it may be advantageous to vary the treatment by first subjecting untreated particulates to one type of plasma activated species treatment and then processing the once treated particulate a second time with a different plasma activated species. Subsequent processing by plasma activated species, or otherwise is also contemplated hereby.

Although the apparatus described herein use radio frequency powered external coil electrodes, other electrode designs and power sources may be employed. Radio frequency coupling of energy through the dielectric wall of treatment chamber permits the use of an external coil, band, clamshell or helical resonator electrodes. External electrodes are preferred in some applications to prevent coating build-up on the electrode and to eliminate the need for vacuum electrical feed throughs. Internal electrodes can be employed with radio frequency and are required when audio frequency is used since audio frequency will not couple through the wall of the treatment chamber. Internal electrodes normally must be liquid cooled because heat dissipation is poor in a vacuum. Coating material may build up on the internal electrodes. Such built-up material may be dislodged and may contaminate the product being treated. Microwave power sources may be used with a metal treatment chamber, but microwave generators normally are expensive and not energy efficient. When used in coating processes, the quartz window required in microwave systems can become coated thus reducing the transmission of microwave energy to the treatment chamber and thus to the treatment zone.

With reference to FIG. 2, another preferred embodiment of the present invention is the use of a socalled plasma afterglow or "afterglow plasma" as the plasma activated species for the treatment of powders or other particulate. The structure of the treatment chamber 10, the particulate feed apparatus, vacuum system and control, and particulate and gas separators are identical to those disclosed in connection with FIG. 1.

However, in accordance with this aspect of the present invention ionizable treatment gas is ionized into a primary plasma by being conveyed through a chamber 31 having an RF plasma generating electrode 11' coiled about it. After ionization, the plasma activated species are introduced into treatment chamber 10' where they interact with untreated powder which is dropping, under the influence of gravity therethrough. In this configuration, treatment zone 30' is not co-extensive or coaxial with the plasma generating electrode 11' as is the case with the apparatus of FIG. 1. Rather, the treatment zone 30' extends from the point at which the plasma activated species are introduced and intermix with the untreated powder and continues downwardly along the length of treatment chamber 10' until the plasma activated species have reached a state where they can no longer influence the structure of, or provide coating to the powder or until the powder is recovered and separated therefrom.

Grafting of unsaturated monomers to a particulate which has been activated by exposure to a primary plasma and/or other plasma activated species can be accomplished using the apparatus illustrated in FIG. 3. Active sites are created on particulate surfaces by exposure thereof to plasma activated species in treatment zone 30. The downwardly flowing inert gas is diverted toward the vacuum pump through the leg of tee 14. A controlled flow of grafting monomer vapor stored in flask 60 is introduced into tee 15 at inlet 70 using a rotameter 50 and a metering valve 40 as previously described. The grafting monomer vapor flow is balanced with the inert gas flow so as to maintain a region of monomer vapor in a grafting zone within pipes 71 and 72' such that the monomer vapor does not rise substantially above tee 14 into treatment zone 30. In this arrangement, the particles drop continuously and directly from the treatment zone into the grafting zone and the particles are maintained under a blanket of the plasma activated species and/or decay products of the plasma activated species from the time that the particles leave the treatment zone to the time they encounter the monomer vapor in the grafting zone or just shortly therebefore. The upwardly flowing grafting monomer vapor contacts the downwardly flowing particulate which has been surface activated or, functionalized, and grafting of the monomer to the activated sites on the surface of the particulate is accomplished.

Where the ionizable gas used to form the plasma activated species is an "inert" gas, the particles are maintained under inert gas protection during this conveyance to the grafting zone. As much as the particles are protected and are conveyed quickly into the grafting zone, relatively short lived active sites on the particles remain active until they react with the monomer vapor in the grafting zone. For certain materials which may have long-lived reactive sites, grafting can be accomplished at atmospheric pressure by contacting the activated particle surface with a liquid grafting monomer. The grafting monomers must contain an unsaturated vinyl or allyl group.

Typical vapors used for grafting include grafting monomers that contain an unsaturated vinyl or allyl group. Therefore, acryl, methacryl, unsaturated amide, diene and trienes in monomeric form may be used for grafting. Examples of plasma initiated grafting can be found in U.S. Pat. No. 4,845,132.

The foregoing will be better understood with reference to the following examples. These examples are for the purpose of illustration. They are not to be considered limiting as to the scope and nature of the present invention.

EXAMPLE 1

An otherwise non-dispersible polyolefin powder was rendered dispersible in water by treating the powder with an air plasma using a prototype apparatus to functionalize the powder surface with polar groups.

The prototype apparatus was configured using a 25 millimeter outside diameter by 18-inch long quartz tube for the treatment chamber and an external coil electrode comprising 14 turns of ¼-inch copper tubing wrapped over a 9-inch length. A 0.75-inch diameter, 0.75-inch pitch, auger rotating at 8 RPM was used to feed the powder into the treatment chamber. A 90 degree elbow was installed in place of tee 14 illustrated in FIG. 1. The treated powder was collected directly in an Edwards High Vacuum (Grand Island, N.Y.) model ITF20 dust filter installed in place of cyclone separator 17 illustrated in FIG. 1.

The 2-inch diameter feed hopper was loaded with polyethylene with a viscosity average molecular weight of 4 million and an average particle size of 120 microns (Hoechst Hostalen (tm) GUR-412). A controlled 18 sccm flow of air was admitted to the treatment chamber maintained at approximately 120 millitorr. RF power at 50 watts and 13.56 megahertz was applied to the coil electrode to generate a primary plasma and other plasma activated species.

The resulting functionalized powder was dispersible in water. A sample of reactive gas treated, but otherwise identical, material was obtained from Air Products and Chemicals (Primax (tm) UH1080) for comparison and ESCA (Electronic Spectroscopy for Chemical Application) indicated the following compositions:

TABLE 1

| | Atomic Concentration (percent) | | |
|---|---|---|---|
| | $C_{1s}$ | $O_{1s}$ | $F_{1s}$ |
| Untreated | 97 | 3 | 0 |

TABLE 1-continued

| | Atomic Concentration (percent) | | |
|---|---|---|---|
| | $C_{1s}$ | $O_{1s}$ | $F_{1s}$ |
| Air Plasma Treated | 91 | 9 | 0 |
| Reactive Gas Treated | 69 | 14 | 17 |

It appears that hydroxyl and carboxylic acid functionality was added to the surface by exposure to the air plasma thus improving dispersibility in water.

Five gram samples of each powder were placed in an oven at 175° C. for 45 minutes. The untreated sample showed no discoloration after melting. The treated sample prepared in accordance with the present invention showed very slight discoloration after melting. The reactive gas treated sample showed severe discoloration after heating with decomposition resulting in a porous appearance.

EXAMPLE 2

In this example the apparatus was configured as in FIG. 1 using a 4-inch inside diameter by 36-inch long glass process pipe for the treatment chamber and a coil electrode comprising 16 turns of ¼-inch copper tubing wrapped over a 28-inch length. A 1-inch diameter, 1-inch pitch, auger rotating at 17 RPM was used to feed the powder into the treatment chamber. The treated powder was recovered using a cyclone separator.

The feed hopper was loaded with a high density polyethylene powder (Quantum Microthene (tm) FA15000) with an average particle size of 20 microns. A controlled 15 sccm flow of air was admitted to the treatment chamber maintained at approximately 80 to 150 millitorr. RF power at 200 watts and 13.56 megahertz was applied to the coil electrode to generate a plasma active species.

The untreated powder was not dispersible in water. The functionalized powder resulting from the use of the present invention was water dispersible.

EXAMPLE 3

Ground tire was treated as described in Example 2. The untreated ground tire was not dispersible in water. The functionalized ground tire resulting from the use of the present invention was dispersible in water.

I claim:

1. A continuous process of treating particulate with a plasma activated species comprising the steps of:
   continuously providing at least one plasma activated species in a treatment zone maintained at subatmospheric pressure;
   continuously dropping a particulate through said treatment zone thereby treating said particulate with said at least one plasma activated species; and
   continuously recovering treated particulate.

2. The method of claim 1 further comprising the step of intermixing said particulate with at least one ionizable gas prior to the step of dropping said particulate through said treatment zone.

3. The method of claim 1 wherein said subatmospheric pressure maintained in said treatment zone ranges from about 0.01 to about 10.0 Torr.

4. The method of claim 3 wherein said subatmospheric pressure maintained in said treatment zone ranges from about 0.01 to about 1.0 Torr.

5. The method of claim 1 wherein said particulate is dropped substantially vertically through said treatment zone.

6. The method of claim 1 wherein said particulate is an inorganic material.

7. The method of claim 1 wherein said particulate is a polymer.

8. The method of claim 7, wherein said particulate is a polymer selected from the group consisting of polyolefins, polyesters and rubbers.

9. The method of claim 1 wherein said treated particulate is functionalized.

10. The method of claim 1 wherein said treated particulate is coated.

11. The method of claim wherein said treated particulate is grafted.

12. The method of claim 1 further comprising the step of continuously conveying said particles from said treatment zone through a grafting zone and maintaining a grafting monomer vapor in said grafting zone, said vapor reacting with said particulate in said grafting zone.

13. The method of claim 12 wherein said step of continuously conveying said particulate through said grafting zone includes the step of continuously dropping said particulate from said treatment zone through said grafting zone.

* * * * *

UNITED STATES PATENT AND TRADEMARK OFFICE
CERTIFICATE OF CORRECTION

PATENT NO. : 5,234,723
DATED : 8/10/93
INVENTOR(S) : Robert J. Babacz

It is certified that error appears in the above-indentified patent and that said Letters Patent is hereby corrected as shown below:

On the title page, item [54] and in column 1, line 1:

In the title, "CONTINOUS" should read --CONTINUOUS--.
Column 8, line 40, after "hopper", insert --1--.
Column 8, line 41, "fee" should read --feed--.
Column 9, line 21, "socalled" should read --so-called--.
Column 12, line 7, after "zone", insert --, homogeneously,--.
Column 12, line 8, after "species", insert --so as to modify the surface of said particulate--.
Column 12, line 34, after "claim", insert --1--.

Signed and Sealed this

Ninth Day of August, 1994

Attest:

BRUCE LEHMAN

*Attesting Officer*    *Commissioner of Patents and Trademarks*